United States Patent
Arnold

(10) Patent No.: US 9,957,799 B2
(45) Date of Patent: May 1, 2018

(54) BALANCE RING FOR GAS TURBINE ENGINE

(71) Applicant: United Technologies Corporation, Hartford, CT (US)

(72) Inventor: Jason Arnold, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 1136 days.

(21) Appl. No.: 13/622,652

(22) Filed: Sep. 19, 2012

(65) Prior Publication Data

US 2014/0079537 A1    Mar. 20, 2014

(51) Int. Cl.
  *F01D 5/02* (2006.01)
  *F16F 15/32* (2006.01)
  *F16F 15/34* (2006.01)

(52) U.S. Cl.
  CPC .......... *F01D 5/027* (2013.01); *F16F 15/322* (2013.01); *F16F 15/34* (2013.01); *F05D 2260/30* (2013.01); *Y10T 74/2132* (2015.01)

(58) Field of Classification Search
  CPC ......... F01D 5/027; F16F 15/32; F16F 15/322; F16F 15/34
  See application file for complete search history.

(56) References Cited

U.S. PATENT DOCUMENTS

| | | |
|---|---|---|
| 4,784,012 A | 11/1988 | Marra |
| 4,833,827 A | 5/1989 | Bode et al. |
| 4,848,182 A | 7/1989 | Novotny |
| 4,892,432 A * | 1/1990 | Cooper .......................... 403/297 |
| 4,926,710 A | 5/1990 | Novotny |
| 5,167,167 A | 12/1992 | Tiernan, Jr. et al. |
| 5,285,700 A | 2/1994 | Lau |
| 5,501,575 A | 3/1996 | Eldredge et al. |
| 7,465,146 B2 | 12/2008 | Kennedy et al. |
| 7,819,622 B2 | 10/2010 | Paulino et al. |
| 8,186,954 B2 | 5/2012 | Lee et al. |
| 2009/0148295 A1 | 6/2009 | Caprario et al. |
| 2010/0129230 A1 | 5/2010 | Tisencheck et al. |
| 2010/0296937 A1 | 11/2010 | Bestwick |
| 2010/0316496 A1 | 12/2010 | Williams et al. |
| 2011/0081253 A1* | 4/2011 | Lecuyer et al. ............ 416/96 R |
| 2012/0107095 A1 | 5/2012 | Juh |
| 2012/0207603 A1 | 8/2012 | Woods et al. |

FOREIGN PATENT DOCUMENTS

| | | | |
|---|---|---|---|
| DE | 3102558 A1 * | 3/1983 | |
| GB | 1514690 A * | 6/1978 | |

* cited by examiner

*Primary Examiner* — Richard Edgar

(74) *Attorney, Agent, or Firm* — Carlson, Gaskey & Olds, P.C.

(57) ABSTRACT

A ring has a ring body with a central portion surrounding an axis and extending to first and second opposing ends separated by a split. The central portion has a first axial thickness. At least one retaining feature is formed on the ring body, the at least one retaining feature having a second axial thickness greater than the first axial thickness. An assembly and a gas turbine engine are also disclosed.

21 Claims, 2 Drawing Sheets

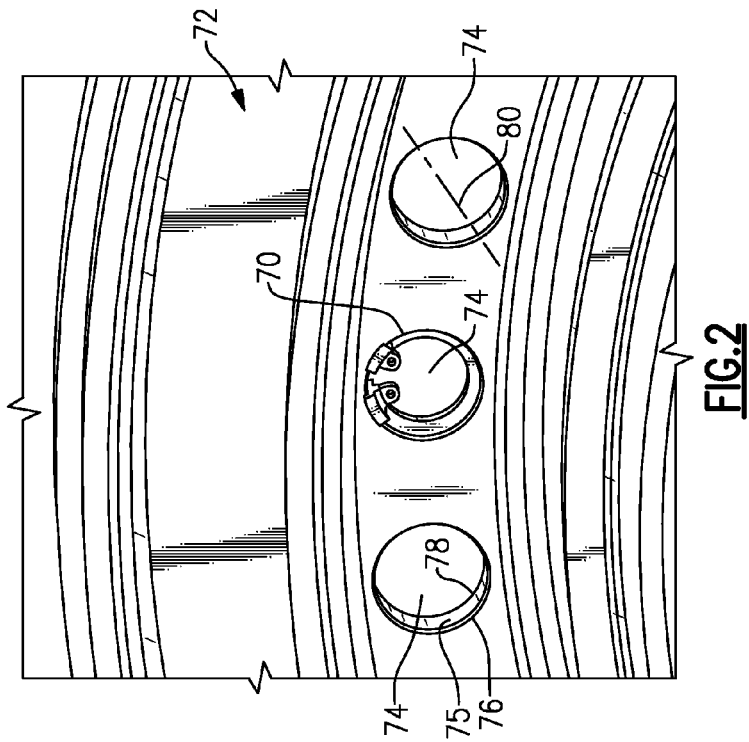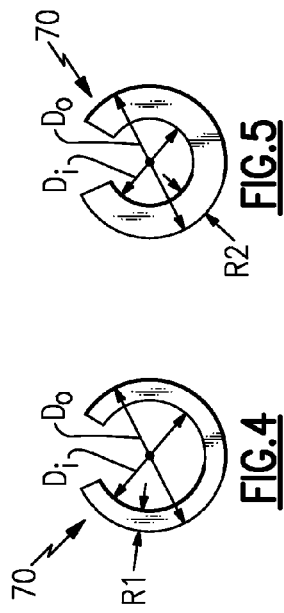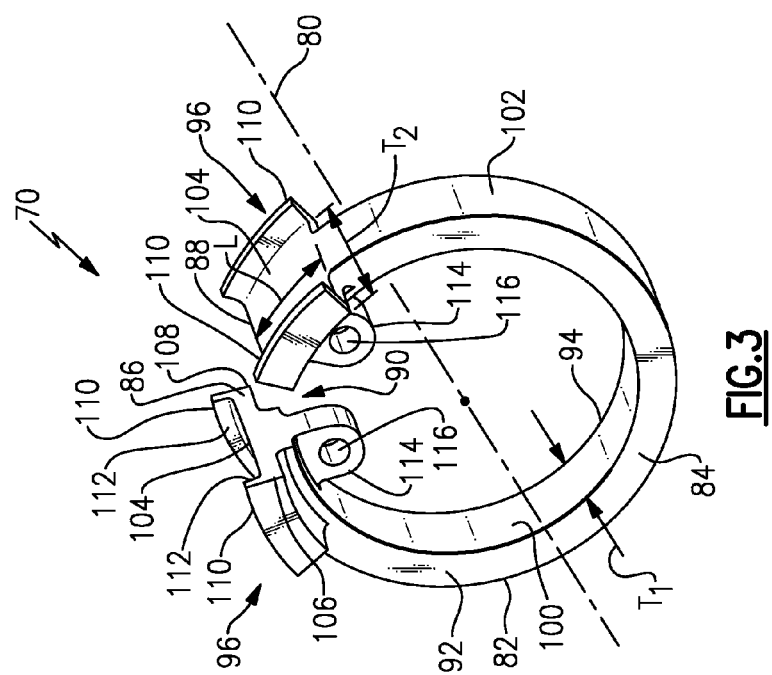

BALANCE RING FOR GAS TURBINE ENGINE

BACKGROUND

With the use of geared turbo fans, the size of an associated engine core can be significantly reduced. This results in a reduction in packaging area within various modules used to make up the engine core. This also minimizes the amount of area that is available for balancing features such as those used for balancing a turbine rotor, for example.

In one example, a turbine section includes flanges that are added to the structure to add weight for balancing purposes. These flanges can also include rivets or fasteners to further increase weight as needed to improve balance. With smaller sized engine cores, there is less space to include weight balance flanges.

In another example, circlips or plugs are added to various structures for balancing purposes. Holes are machined in the structure to receive the circlips or plugs. Further, holes for circlips must be machined with a groove such that the circlip can be securely installed. The additional machining steps increase assembly time and cost.

SUMMARY

According to an exemplary embodiment of this disclosure, among other possible things includes a ring having a ring body with a central portion surrounding an axis and extending to first and second opposing ends separated by a split. The central portion has a first axial thickness. At least one retaining feature is formed on the ring body, the at least one retaining feature having a second axial thickness greater than the first axial thickness.

In another embodiment according to the previous embodiment, the ring body defines an inner peripheral surface and an outer peripheral surface. The at least one retaining feature comprises an axial portion extending across the outer peripheral to define the second axial thickness between first and second edges. The at least one retaining feature includes a lip extending outwardly from each of the first and second edges.

In another embodiment according to any of the previous embodiments, the lips extend radially outwardly relative to the axis and have opposing gripping surfaces configured to clamp a structure between the lips.

In another embodiment according to any of the previous embodiments, the retaining feature is formed at each of the first and second opposing ends.

In another embodiment according to any of the previous embodiments, the ring body includes an assembly feature configured to receive a tool. The first and second ends are movable toward each other by the tool to provide an installation position. The first and second ends are resiliently biased apart from each other once installed to provide an assembled position.

In another embodiment according to any of the previous embodiments, the assembly feature comprises a pair of lugs extending radially inwardly toward the axis. Each lug includes an opening to receive the tool.

In another featured embodiment, an assembly includes a component having a front face and a rear face. At least one hole extends entirely through the component from the front face to the rear face. A ring is installed within the at least one hole, and has a central portion surrounding an axis and extending to first and second opposing ends separated by a split. The ring includes at least one retaining feature that grips the front and rear face of the component to retain the ring within the at least one hole.

In another embodiment according to the previous embodiment, the component has a rotating component. The ring has a balance ring received within the hole to provide a desired balance characteristic during rotation.

In another embodiment according to any of the previous embodiments, the ring has a metering ring received within the hole to control an amount of flow through the hole.

In another embodiment according to any of the previous embodiments, the at least one retaining feature has at least first and second retaining features formed respectively on the first and second opposing ends of the ring.

In another embodiment according to any of the previous embodiments, the ring has a central portion with a fore face and an aft face that are separated by a first axial thickness. The at least one retaining feature is defined by a second axial thickness greater than the first axial thickness.

In another embodiment according to any of the previous embodiments, the retaining feature includes a first portion defining the second axial thickness. The first portion extends across an outer periphery of the ring to a forward edge that extends axially beyond the front face of the component. A rearward edge extends axially beyond the rear face of the component.

In another embodiment according to any of the previous embodiments, the retaining feature includes a second portion that extends radially outwardly from each of the forward and rearward edges to grip the front and rear faces of the component.

In another embodiment according to any of the previous embodiments, the balance ring is moveable between an initial installation position where the first and second opposing ends are compressed toward each other and a subsequent assembled position where the first and second opposing ends are resiliently biased away from each other such that an outer peripheral surface of the ring is biased against a circumferential surface that defines the hole.

In another embodiment according to any of the previous embodiments, the ring includes a pair of radially inwardly extending lugs that are configured to receive a tool to move the first and second opposing ends to the initial installation position.

In another embodiment according to any of the previous embodiments, the ring has a predetermined radial thickness selected from a plurality of rings having different radial thicknesses to define at least one of a desired balancing characteristic or a desired flow metering characteristic through the at least one hole.

In another featured embodiment, a gas turbine engine has a non-rotating engine structure. A first shaft rotates about an engine axis relative to the non-rotating engine structure. At least a first compressor section is connected to the first shaft. At least a first turbine section is connected to the first shaft. The first turbine section includes a cover plate with a plurality of cooling holes extending though the cover plate from a front face to a rear face. A ring is installed within at least one of the cooling holes, the ring having a central portion surrounding an axis and extending to first and second opposing ends separated by a split. The ring includes at least one retaining feature that grips the front and rear face of the cover plate to retain the ring within the at least one hole.

In another embodiment according to any of the previous embodiments, the at least one retaining feature has at least first and second retaining features formed respectively on the first and second opposing ends of the ring.

In another embodiment according to any of the previous embodiments, each retaining feature includes a first portion extending across an outer periphery of the ring to a forward edge that extends axially beyond the front face of the cover plate and a rearward edge that extends axially beyond the rear face of the cover plate. The retaining feature includes a second portion that extends radially outwardly from each of the forward and rearward edges to grip the front and rear faces of the cover plate.

In another embodiment according to any of the previous embodiments, the ring has one of a metering ring to control flow through the cooling hole or a balance ring to balance the cover plate. The at least one cooling hole is defined by a smooth circumferential surface that extends about the axis. The one of the metering or balance ring is moveable between an initial installation position where the first and second opposing ends are compressed toward each other and a subsequent assembled position where the first and second opposing ends are resiliently biased away from each other such that an outer peripheral surface of the one of the metering or balance ring is biased against the smooth circumferential surface of the cooling hole.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a perspective view of a portion of a turbine cover plate with a balance ring.

FIG. 3 is a perspective view of the balance ring of FIG. 2.

FIG. 4 is a schematic section of one example of a balance ring with a first radial thickness.

FIG. 5 is a schematic section of another example of a balance ring with a second radial thickness.

DETAILED DESCRIPTION

Figure 1:
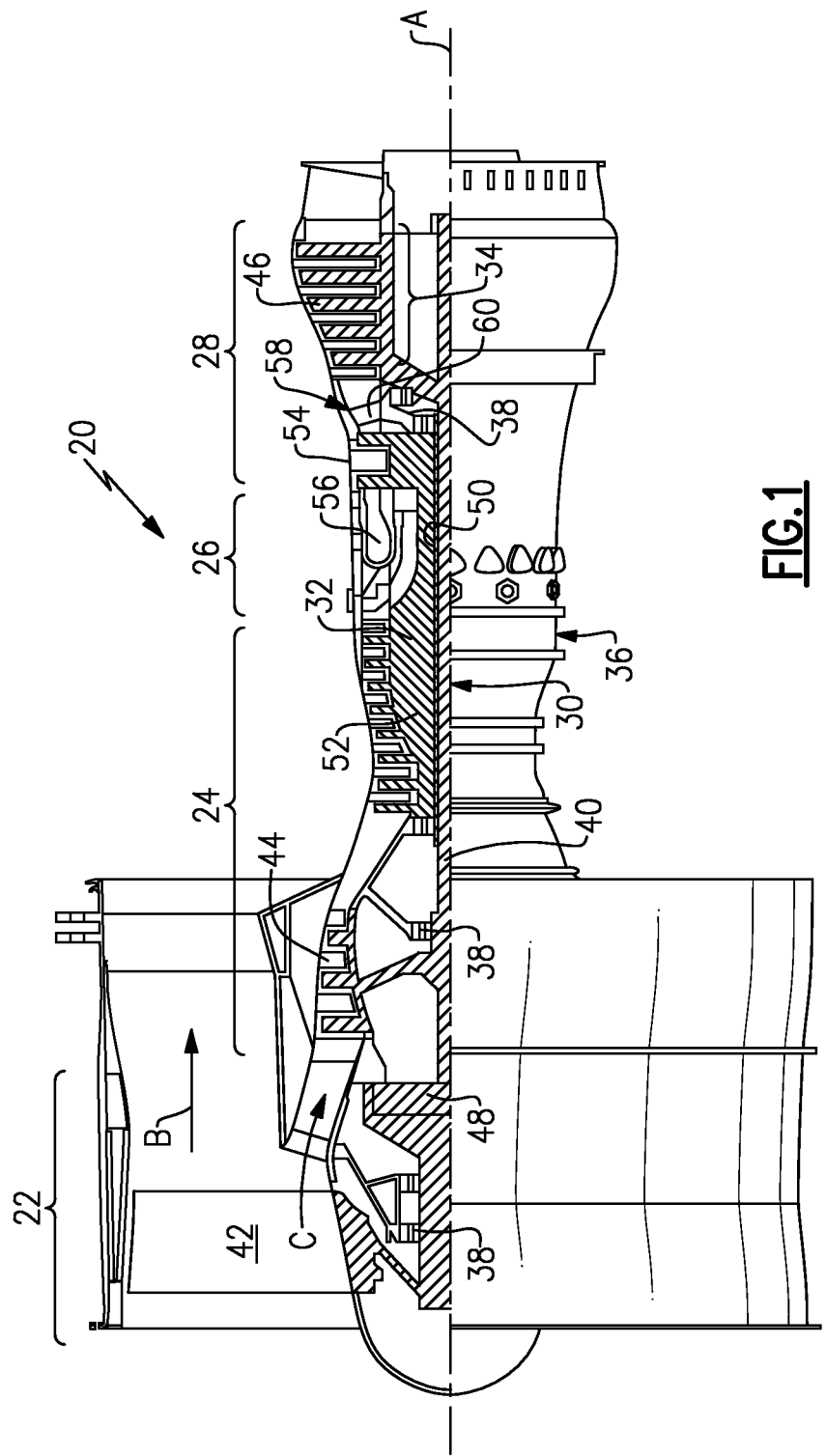
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or second) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or first) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

A ring 70 (FIG. 2) is used to add weight to various areas within the engine core for balancing purposes. Optionally, the ring 70 can be used to provide a flow metering effect or a combination of a balance and metering effect, which will be discussed in greater detail below. FIG. 2 shows one example of an engine area that utilizes the ring 70; however, it should be understood that the ring could be used in other areas of the engine as needed, and/or could also be utilized as a flow metering ring.

FIG. 2 shows a cover plate 72 that is used in the high pressure turbine section 54. The cover plate 72 includes a plurality of cooling holes 74 that direct cooling air as needed. The cover plate 72 has a front face 76 and a rear face 78. The cooling holes 74 extend entirely through a thickness of the cover plate 72 from the front face 76 to the rear face 78. Each cooling hole 74 is defined by a smooth circumferential surface 75 that extends about a respective hole axis 80.

In one example, the ring 70 comprises a balance ring 70 that is installed into one or more of these already existing cooling holes 74 to provide the desired amount of balance.

As shown in FIG. 3, each balance ring 70 includes a ring body 82 having a central portion 84 surrounding the axis 80 and extending to first 86 and second 88 opposing ends that are separated by a split 90. The ring body 82 has a front face 92 and a rear face 94. The central portion 84 is defined by a first axial thickness T1 that extends from the front face 92 to the rear face 94.

The balance ring 70 also includes least one retaining feature 96 formed in the ring body 82. In one example, the retaining feature 96 is formed at one of the first 86 and second 88 opposing ends. The retaining feature 96 is configured to grip the front 76 and rear 78 faces of the cover plate 72 (FIG. 2) to securely hold the balance ring 70 within the hole 74. The retaining feature 96 has a second axial thickness T2 that is greater than the first axial thickness T1. In one example, the retaining feature 96 is formed at each of the first 86 and second 88 opposing ends. Further, in addition to the retaining features 96 at each end, other retaining features 96 could be formed anywhere around the circumference of the ring. In one example, an additional retaining feature 96 could be added in the center body portion opposite from the ends, i.e. at the bottom of the ring, to prevent disassembly during operation. The additional retaining features should be sized such that overall compression of the ring allows the retaining features to clear the hole for installation purposes. In another example, the retaining feature 96 can be formed anywhere about the circumference of the ring body 82 instead of just at the ends.

The balance ring 70 includes an inner peripheral surface 100 and an outer peripheral surface 102 that surround the axis 80. In one example, the inner 100 and outer 102 peripheral surfaces are smooth surfaces.

The retaining feature 96 comprises a first portion 104 defining the second thickness T2. In one example, the first portion 104 comprises a flange that extends in an axial direction across an outer periphery of the balance ring 70. The first portion 104 extends to a forward edge 106 that extends axially beyond the front face 76 of the cover plate 72 and a rearward edge 108 that extends axially beyond the rear face 78 of the cover plate 72 when installed. The first portion 104 has a length L extending about a portion of the circumference of the balance ring. The length L can be increased or decreased as needed to provide a more secure attachment.

The retaining feature 96 includes a second portion 110 that extends radially outwardly from each of the forward 106 and rearward edges 108. In one example, the second portion 110 comprises lips that are configured to grip or clamp the front 76 and rear 78 faces of the cover plate 72. The second portion 110 includes abutment surfaces 112 that abut against the front 76 and rear 78 faces of the cover plate 72 to provide axial retention of the balance ring 70 within the hole 74.

The balance ring 70 is moveable between an initial installation position where the first 86 and second 88 opposing ends are compressed toward each other and a subsequent assembled position where the first 86 and second 88 opposing ends are resiliently biased away from each other. In one example, the balance ring 70 includes a pair of radially inwardly extending lugs 114 that are configured to receive a tool (not shown), such as a pair of pliers for example, to move the first 86 and second 88 opposing ends to the initial installation position. The lugs 114 each include an opening 116 to receive the tool such that the ends 86, 88 can be compressed together against their spring bias. Once the ends 86, 88 are compressed together, the balance ring 70 is inserted in the hole 74 such that the abutment surfaces 112 abut against the front 76 and rear 78 faces of the cover plate 72. Then the tool is removed and the resilient spring bias of the balance ring 70 causes the ends 86, 88 to move away from each other such that the outer peripheral surface 102 of the balance ring 70 is biased against the smooth circumferential surface 75 that defines the hole 74 to provide radial retention of the balance ring 70. The biasing spring force should be sufficient such that adequate friction loading is provided at all operating conditions to prevent the ring from rotating within the hole. Also, during operation, the centrifugal loads act in cooperation with the spring bias force to hold the balance ring in place.

The balance ring 70 has a radial thickness R1 that is defined between an outer diameter Do and an inner diameter Di as shown in FIG. 4. As discussed above, the balance ring 70 is configured to be installed within existing cooling holes 74. In certain applications, it is desirable to meter the amount of cooling air that flows through the holes. In this example, the ring 70 comprises a metering ring that can vary the radial thickness by varying the inner diameter Di, which will result in varying the amount of air that can flow through the associated hole. Further, balance can also be adjusted as needed by varying the radial thickness to increase or decrease the weight of the ring.

As such, a plurality of rings can be provided with different radial thicknesses to provide a desired balancing and/or metering characteristic. The outer diameter Do remains constant such that the balance ring can be inserted within the holes. The inner diameter Di can be reduced to provide an increased radial thickness R2, such as that shown in FIG. 5. This acts as a flow restriction within the cooling hole 74. Thus, for each application, a ring 70 is selected from a plurality of rings 70 having different radial thicknesses to define a desired flow metering through the cooling hole 74 or provide a desired balancing characteristic. Each cooling hole could have a ring with the same radial thickness or rings with different radial thicknesses could be used for each cooling hole. Further, a ratio of the ring thickness to hole thickness, along with tab-to-hole edge clearances should be sized to prevent the ring from working itself out of the hole.

The subject balance ring provides balance capability by utilizing mating part holes where space or stresses prevent the addition of a balance flange. Further, assembly and disassembly are simplified as there are no requirements for riveting or press fitting a fastener or plug into a hole. Also, as discussed above, multiple classes of rings can be made to provide the required balance resolution or flow area.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An assembly comprising:
a component having a front face and a rear face;
at least one hole extending entirely through the component from the front face to the rear face; and
a ring having a central portion received within the at least one hole such that the central portion does not extend beyond the front and rear faces, the central portion surrounding an axis and extending to first and second opposing ends separated by a split, and wherein the ring includes at least one retaining feature that grips the front and rear face of the component to retain the ring within the at least one hole.

2. The assembly according to claim 1 wherein the component comprises a rotating component and wherein the ring comprises a balance ring received within the hole to provide a desired balance characteristic during rotation.

3. The assembly according to claim 1 wherein the ring comprises a metering ring received within the hole to control an amount of flow through the hole.

4. The assembly according to claim 1 wherein the at least one retaining feature comprises at least first and second retaining features formed respectively on the first and second opposing ends of the ring.

5. The assembly according to claim 1 wherein the ring has a central portion with a fore face and an aft face that are separated by a first axial thickness, and wherein the at least one retaining feature is defined by a second axial thickness greater than the first axial thickness.

6. The assembly according to claim 5 wherein the retaining feature includes a first portion defining the second axial thickness, the first portion extending across an outer periphery of the ring to a forward edge that extends axially beyond the front face of the component and a rearward edge that extends axially beyond the rear face of the component.

7. The assembly according to claim 6 wherein the retaining feature includes a second portion that extends radially outwardly from each of the forward and rearward edges to grip the front and rear faces of the component.

8. The assembly according to claim 7 wherein the balance ring is moveable between an initial installation position where the first and second opposing ends are compressed toward each other and a subsequent assembled position where the first and second opposing ends are resiliently biased away from each other such that an outer peripheral surface of the ring is biased against a circumferential surface that defines the hole.

9. The assembly according to claim 8 wherein the ring includes a pair of radially inwardly extending lugs that are configured to receive a tool to move the first and second opposing ends to the initial installation position.

10. The assembly according to claim 1 wherein the ring has a predetermined radial thickness selected from a plurality of rings having different radial thicknesses to define at least one of a desired balancing characteristic or a desired flow metering characteristic through the at least one hole.

11. The assembly according to claim 1 wherein the ring comprises one of a metering ring to control cooling flow through the hole or a balance ring to balance the component, and wherein the central portion is received within the at least one hole such that the central portion does not extend beyond the front and rear faces of the component.

12. The assembly according to claim 11 wherein the ring has a ring front face and a ring rear face with a first axial thickness being defined as a distance between the ring front face and the ring rear face, and wherein the at least one retaining feature comprises an axial portion extending across an outer peripheral surface of the ring and axially beyond the ring front and ring rear faces to define a second axial thickness greater than the first axial thickness.

13. The assembly according to claim 12 wherein the at least one retaining feature is formed at each of the first and second opposing ends of the ring with a remaining portion of the ring having the first axial thickness.

14. A gas turbine engine comprising:
a non-rotating engine structure;
a first shaft rotating about an engine axis relative to the non-rotating engine structure;
at least a first compressor section connected to the first shaft;
at least a first turbine section connected to the first shaft, the first turbine section including a cover plate with a plurality of cooling holes extending though the cover plate from a front face to a rear face; and a ring installed within at least one of the cooling holes, the ring having a central portion surrounding an axis and extending to first and second opposing ends separated by a split, and wherein the ring includes at least one retaining feature that grips the front and rear face of the cover plate to retain the ring within the at least one hole.

15. The gas turbine engine according to claim 14 wherein the at least one retaining feature comprises at least first and second retaining features formed respectively on the first and second opposing ends of the ring.

16. The gas turbine engine according to claim 15 wherein each retaining feature includes a first axial portion extending across an outer periphery of the ring to a forward edge that extends axially beyond the front face of the cover plate and a rearward edge that extends axially beyond the rear face of the cover plate, and wherein the retaining feature includes a second radial portion that extends radially outwardly from each of the forward and rearward edges to grip the front and rear faces of the cover plate.

17. The gas turbine engine according to claim 14 wherein the ring comprises one of a metering ring to control flow through the cooling hole or a balance ring to balance the cover plate, and wherein the at least one cooling hole is defined by a smooth circumferential surface that extends about the axis, and wherein the one of the metering or balance ring is moveable between an initial installation position where the first and second opposing ends are compressed toward each other and a subsequent assembled position where the first and second opposing ends are resiliently biased away from each other such that an outer peripheral surface of the one of the metering or balance ring is biased against the smooth circumferential surface of the cooling hole.

18. The gas turbine engine according to claim 14 wherein the central portion is received within the at least one cooling hole such that the central portion does not extend beyond the front and rear faces of the cover plate.

19. The gas turbine engine according to claim 14 wherein the ring has a ring front face and a ring rear face with a first axial thickness being defined as a distance between the ring front face and the ring rear face, and wherein the at least one retaining feature comprises an axial portion extending across an outer peripheral surface of the ring and axially beyond the ring front and ring rear faces to define a second axial thickness greater than the first axial thickness.

20. The gas turbine engine according to claim 19 wherein the at least one retaining feature is formed at each of the first and second opposing ends of the ring with a remaining portion of the ring having the first axial thickness.

21. A ring comprising:

a ring body having a central portion surrounding an axis and extending to first and second opposing ends separated by a split, the central portion having a first axial thickness; and at least one retaining feature formed on the ring body, the at least one retaining feature having a second axial thickness greater than the first axial thickness, and wherein the at least one retaining feature includes opposing gripping surfaces configured to clamp a structure therebetween for movement therewith, and wherein the retaining feature is formed at each of the first and second opposing ends of the ring body with a remaining portion of the ring body having the first axial thickness.

* * * * *